(No Model.)
J. GRANT.
TILE MOLD.
No. 298,847. Patented May 20, 1884.
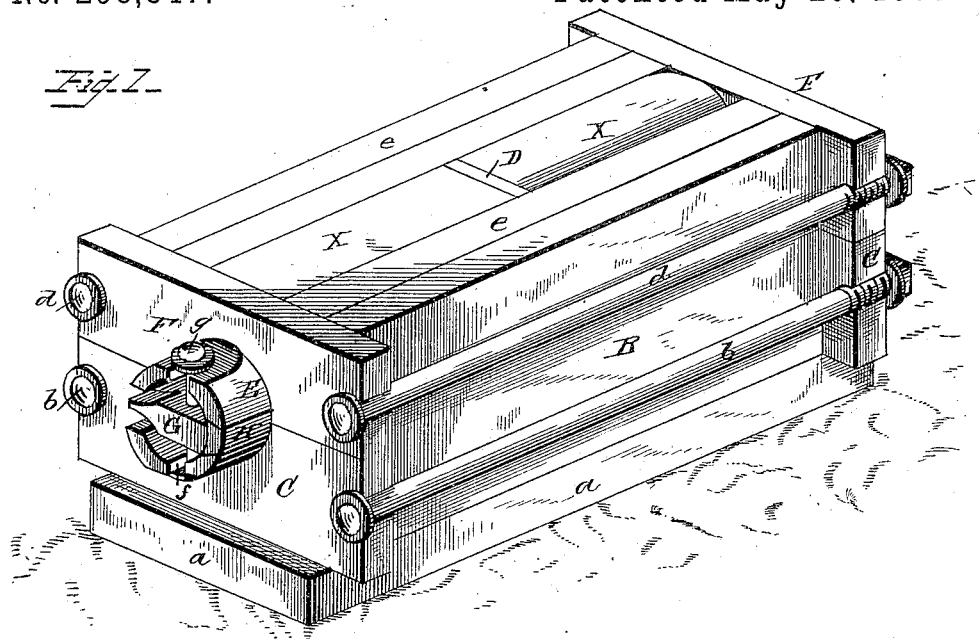
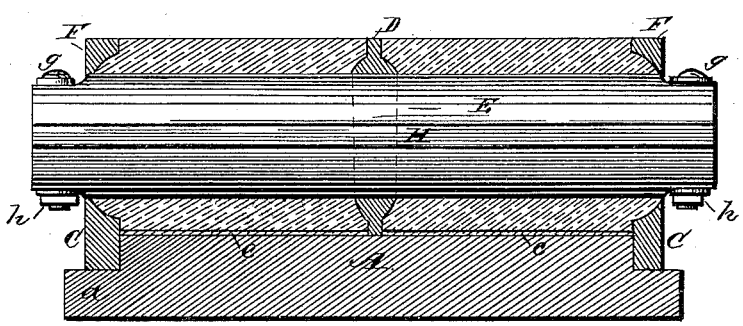
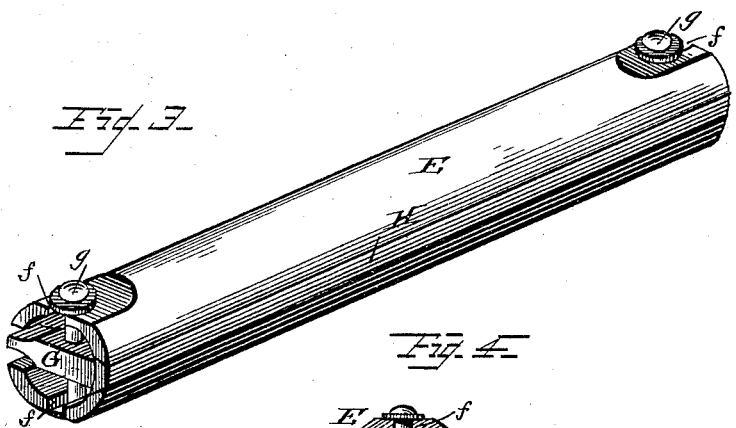
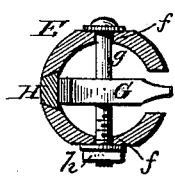
WITNESSES
J. L. Ormand
L. L. Miller
INVENTOR
James Grant,
per Chas. H. Fowler
Attorney

UNITED STATES PATENT OFFICE.

JAMES GRANT, OF GOSHEN, INDIANA.

TILE-MOLD.

SPECIFICATION forming part of Letters Patent No. 298,847, dated May 20, 1884.

Application filed March 18, 1884. (No model.)

*To all whom it may concern:*

Be it known that I, JAMES GRANT, a citizen of the United States, residing at Goshen, in the county of Elkhart and State of Indiana, have invented certain new and useful Improvements in Tile-Molds; and I do hereby declare that the following is a full, clear, and exact description of the same, reference being had to the annexed drawings, making a part of this specification, and to the letters and figures of reference marked thereon.

Figure 1 of the drawings is a perspective view of a mold with my improved core in position. Fig. 2 is a sectional view thereof with the core in elevation. Fig. 3 is a detail view, in perspective, of the core; and Fig. 4, a cross-section of the same.

The present invention has relation to that class of molds for forming sewer, drain, water, or other cement pipe wherein a collapsible core is employed for rendering it easily and readily withdrawn after the pipe has been molded.

The object of the invention is to improve the construction of the above-mentioned class of cores, whereby the method of producing the pipe is greatly facilitated, the core readily and quickly removed, and adapting the mold for producing one, two, or more pipes at the same time with the male and female portions at their respective ends. These objects I attain by the construction substantially as shown in the drawings, and hereinafter described and claimed.

In the accompanying drawings, A represents a suitable platform, of any desirable size and shape, having a flange, $a$, at its four sides, upon which rest the side sections, B, and lower end sections, C. After these sections are placed in position, the lower section of a ring, D, is passed down through a groove in the middle of the side pieces or sections, B, until it rests firmly on the platform A, after which the rods $b$ are inserted in grooves in the edges of the end sections, and by suitable nuts clamp and hold securely in position said sections in connection with the side sections, B, the nuts engaging with the screw-threaded ends of the rods. Suitable formers, $c$, to give the required shape to the lower or bottom portion of the pipe, are next placed in position, resting on the platform A. These formers may be of any desirable shape or design, in accordance with the form or shape of the pipe to be molded, and therefore it is considered unnecessary to go into detail in their description, or show their construction further than what is illustrated in Fig. 2, which indicates simply the position they occupy. When the formers $c$ are in position, the material in a plastic state is put in and properly packed, thus forming the bottom half of the pipe. The core E is now placed in position, as shown in Fig. 2, the ends projecting beyond the end sections, after which the upper end sections, F, are put in place, as shown in Fig. 1, and the upper rods, $d$, secured in place the same as the lower ones, after which the upper half of the sectional ring D is passed down through the groove in the side sections, B, until it rests on the core E and meets the lower half of said ring. The material which is to form the upper half of the pipe is now packed around and over the core, and when near to the top suitable strips, $e$, are placed in position, as shown, and pressed down so that they are even on the top with the top edge of the side sections, B. These strips $e$ may be of any desirable shape, and, like the formers $c$, are simply intended to give shape to the pipe at the top. The inner sides of the end sections, C F, and the ring D give to the ends of the pipe represented at X the male and female shape.

I have shown the mold adapted to produce two sections of pipe; but, so far as the core is concerned, I do not desire to confine myself to any number of sections, as by lengthening the core it may be adapted to produce any number, or, if desired, simply a single pipe.

I further desire to be understood that the core is adapted for use in any mold where clay or cement pipe is made, and therefore I do not confine my invention to the construction of mold shown, and therefore it may be variously modified, as found desirable.

The core E, which is the essential part of the invention, is made in longitudinal sections, preferably two sections, as shown. Each of the ends of the sections forming the core has suitable notches, $f$, diametrically opposite each other, to receive a pin, $g$, which acts as a pivot for a suitable latch, G, a similar pin and latch being provided at the opposite end of the core. A longitudinal strip is located between the sections forming the core, which I term a "key, H," said strip being of the same length as the core, and preferably dovetailed in cross-section, and the edges of the core-sections beveled to correspond. Thus when pressure is brought against it by the latches it will not pass beyond the outer periphery of the core, but hold the sections together in a firm manner until the key is released. When it is desired to withdraw the core, the latches G are released from contact with the key H, allowing the latter to be pushed into the core, thus removing support from the sections, after which they will come together, thereby contracting the core and rendering it readily removed from the mold. The pins $g$, at one end, are screw-threaded to receive suitable nuts, $h$, for tightening the pin and drawing the core-sections together against the key.

In case a number of short pipes should be made at one time without any flanges or the female and male portion at the ends of the pipe, and in order that the pipes may be cut off squarely and evenly, an equivalent for the sectional ring D may be employed, as well as for the end sections, C F, by substituting a thin strong twine or thin wire. This twine or wire is laid in the bottom of the mold, say, one or two feet apart, or as long as you desire to make the pieces of pipe. Then form the lower half of the pipe, and afterward properly place therein the core. The upper half of pipe being formed, the frame-work of the mold is next taken apart, leaving the platform in position, after which the twine or wire is used to saw the material forming the pipe, until it is cut down to the core. After the pipe is hardened and removed, the pipe will be without flanges on its ends and have a straight even edge.

Having now fully described my invention, what I claim as new, and desire to secure by Letters Patent, is—

1. A collapsible core formed in longitudinal sections and provided with notches at its ends, in combination with a longitudinal strip located between said sections to form a key, and screw-threaded pins seated in the notches of the sections and provided with tightening-nuts and pivoted latches, whereby the sections of the core are drawn together against the key and the latter held in position between the same, substantially as and for the purpose set forth.

2. The combination, with a collapsible core formed in longitudinal sections and provided with a key held between them by a pin and latch, of a mold-frame consisting of a suitable base or platform provided with removable side and end sections, said end sections being divided longitudinally, and each half having at its ends notches or grooves and clamping-rods seated therein, and provided with nuts engaging the screw-threaded ends thereof to securely hold both the side and end sections together and to the base or platform, substantially as and for the purpose specified.

In testimony that I claim the above I have hereunto subscribed my name in the presence of two witnesses.

JAMES GRANT.

Witnesses:
LEW. WANNER,
W. H. PARKS.